US010630083B2

United States Patent
McEwan

(10) Patent No.: US 10,630,083 B2
(45) Date of Patent: Apr. 21, 2020

(54) REAL TIME ACTIVE MULTI-CELL BALANCING

(71) Applicant: Digital Aerolus, Inc., Shawnee, KS (US)

(72) Inventor: Ian J. McEwan, Pasadena, CA (US)

(73) Assignee: Digital Aerolus, Inc., Shawnee, KS (US)

( * ) Notice: Subject to any disclaimer, the term of this patent is extended or adjusted under 35 U.S.C. 154(b) by 251 days.

(21) Appl. No.: 15/807,164

(22) Filed: Nov. 8, 2017

(65) Prior Publication Data

US 2018/0131197 A1   May 10, 2018

Related U.S. Application Data

(60) Provisional application No. 62/419,298, filed on Nov. 8, 2016.

(51) Int. Cl.
*H02J 7/00* (2006.01)
*G06F 17/18* (2006.01)

(52) U.S. Cl.
CPC ............ *H02J 7/0014* (2013.01); *G06F 17/18* (2013.01); *H02J 7/0019* (2013.01); *H02J 7/0021* (2013.01)

(58) Field of Classification Search
USPC .......................................... 320/119
See application file for complete search history.

(56) References Cited

U.S. PATENT DOCUMENTS

| | | |
|---|---|---|
| 2008/0235172 A1 | 9/2008 | Rosenstein et al. |
| 2010/0194339 A1 | 8/2010 | Yang et al. |
| 2010/0277123 A1 | 11/2010 | Lim et al. |
| 2011/0057617 A1 | 3/2011 | Finberg et al. |
| 2011/0254502 A1 | 10/2011 | Yount et al. |
| 2014/0100711 A1 | 4/2014 | Gibbs |
| 2014/0266072 A1 | 9/2014 | Gong |
| 2015/0380952 A1* | 12/2015 | Brandt ............... H01M 10/441 320/119 |
| 2016/0099587 A1 | 4/2016 | Becker et al. |
| 2016/0241058 A1 | 8/2016 | Carralero et al. |

OTHER PUBLICATIONS

Search Report and Written Opinion for related PCT Application No. PCT/US2017/060670 dated Jan. 12, 2018, 18 pages.

\* cited by examiner

*Primary Examiner* — Robert Grant
(74) *Attorney, Agent, or Firm* — Hovey Williams LLP

(57) ABSTRACT

A computer-implemented system and method for balancing battery cells of a multi-cell battery, the system comprising a processor configured to determine a state of charge for each battery cell, generate a probability table for all of the battery cells based on a difference between the state of charge for each battery and a mean state of charge, select one of the battery cells via probabilistic selection according to the probability table, and generate an instruction for adjusting a charge of the selected battery cell.

16 Claims, 3 Drawing Sheets

REAL TIME ACTIVE MULTI-CELL BALANCING

RELATED APPLICATIONS

This regular utility non-provisional patent application claims priority benefit with regard to all common subject matter of earlier filed U.S. Provisional Patent Application titled "REAL TIME ACTIVE MULTI-CELL BALANCING", Ser. No. 62/419,298, filed on Nov. 8, 2016, which is hereby incorporated by reference in its entirety into the present application.

BACKGROUND

Multi-cell batteries typically do not charge and discharge evenly because some of the battery cells are weaker than others. Unmanaged charging can result in the weaker battery cells being overcharged, and unmanaged discharging can result in the weaker battery cells being over-depleted with the stronger battery cells, and hence the battery itself, not being utilized to their full potential. For these reasons, battery management systems are typically used for implementing passive or active battery balancing during or in conjunction with charging and discharging.

Passive battery balancing entails drawing energy (i.e., "charge") from the most charged battery cell and dissipating the drawn charge usually in the form of heat. This is undesirable during charging because the charge is drawn from the weakest battery cells, which quickly ages them. Passive battery balancing is also undesirable during discharging because charge is drawn from the strongest battery cell, which decreases discharge depth of the battery. That is, the battery lasts only as long as the weakest battery cell. Some "smart" battery management systems improve upon this by focusing on the strongest battery cell. However, this stresses the strongest battery cell and only relieves the weakest battery cell.

Active balancing entails moving charge from higher energy battery cells to lower energy battery cells. Battery cells are typically selected for balancing according to the difference between each battery cell's state of charge and the mean state of charge for all of the battery cells. However, there is a maximum amount or rate of charge that can be transferred between battery cells, which often results in the battery cells remaining unbalanced during maximum charging and maximum discharging.

SUMMARY

Embodiments of the present invention solve the above-described and other problems and limitations by providing an improved system and method for balancing multi-cell batteries. More particularly, the invention provides a battery management system and method that improves battery life and increases discharge depth of the battery.

An embodiment of the invention is a method of balancing battery cells of a multi-cell battery via probabilistic selection. First, a multi-cell battery management system is initialized according to the type, model, battery cell number, and/or layout of the multi-cell battery. Initial battery cell states and initial battery cell selection probabilities may be assigned for each battery cell in a probability table. For example, the initial battery cell selection probabilities may be equal for all of the battery cells or may take into account different initial battery cell states such as battery cell impedance. In one embodiment, the probability table may be a normalized cumulative probability table.

Currents and voltages are then measured across the battery cells via a plurality of sensors. The measured current and voltage values may be stored in the probability table.

The measured current and voltage values are then used to estimate states of charge of the battery cells. This may be performed via a Thevenin model, a dual polarization model, or any other suitable state of charge estimation technique. The Thevenin model includes internal resistances from the physical electrodes and models the electrolyte as a resistor-capacitor pair. The dual polarization model includes internal resistances from the physical electrodes and models the electrolyte as resistor-capacitor pairs in series. This model separates surface and diffusion effects in the electrolyte. States of charge estimation may be performed over a relatively slow timescale such as approximately one percent of a battery discharge time.

The states of charge are then used to compute cell selection probabilities for adjusting charges of each battery cell. The probabilities are updated in the probability table, which may be fit to a probability function. For example, the probability table may be a normalized cumulative probability function such that the probability of one of the battery cells being selected is a function of the battery cell's deviation from the mean state of charge, with the sum of all of the probabilities being equal to 1. The above steps are repeated as needed during balancing.

The multi-cell battery may then be balanced, during charging or discharging or at rest, by selecting a battery cell or battery cell pair according to the probabilities in the probability table. Battery cells that have a state of charge that has a high deviation from the mean state of charge are more likely to be selected, whereas battery cells that have a state of charge that is close to the mean state of charge are less likely to be selected. The charge of the selected battery cell or battery cell pair may then be adjusted. For example, if the multi-cell battery is being charged, the selected battery cell may receive an incremental charge. If the multi-cell battery is being discharged, an incremental charge may be drawn from the selected battery cell. If the multi-cell battery is only being balanced, a charge may be moved between a pair of selected battery cells. Balancing steps may be performed several times per second, such as at a rate of every 10 milliseconds. In this way, the battery cells are balanced in real time. The probability table may be updated at a one-to-one rate as the battery cell or battery cell pair adjustments are made or at any other suitable rate. State of charge estimation and probability updating may be performed simultaneously with charging and discharging.

In one embodiment, data representative of a dummy battery cell may be added to the probability table. The dummy battery cell has a state of charge with a fixed deviation from the mean state of charge. When the battery cells are unbalanced, the probability of the dummy battery cell being selected is low and thus the dummy battery cell is selected relatively infrequently. When the battery cells are well-balanced, the dummy battery cell is selected relatively frequently. This prevents the multi-cell battery management system from unnecessarily trying to balance very small deviations.

The above-described method provides several advantages. For example, battery cells are chosen for receiving a charge or for having a charge withdrawn therefrom according to probabilistic selection, which results in more balanced charging and discharging across all of the battery cells. The probabilistic selection prevents battery cells from being overcharged and over-depleted and does not focus on the weakest battery cell or the strongest battery cell, which increases battery life. The probabilistic selection also prevents some battery cells from being under-utilized, which maximizes battery discharge depth and battery strength. Battery balancing according to probabilistic selection can also be performed at rest by adjusting charge between selected pairs of battery cells.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular configurations of the present invention can include a variety of combinations and/or integrations of the embodiments described herein.

Figure 1:
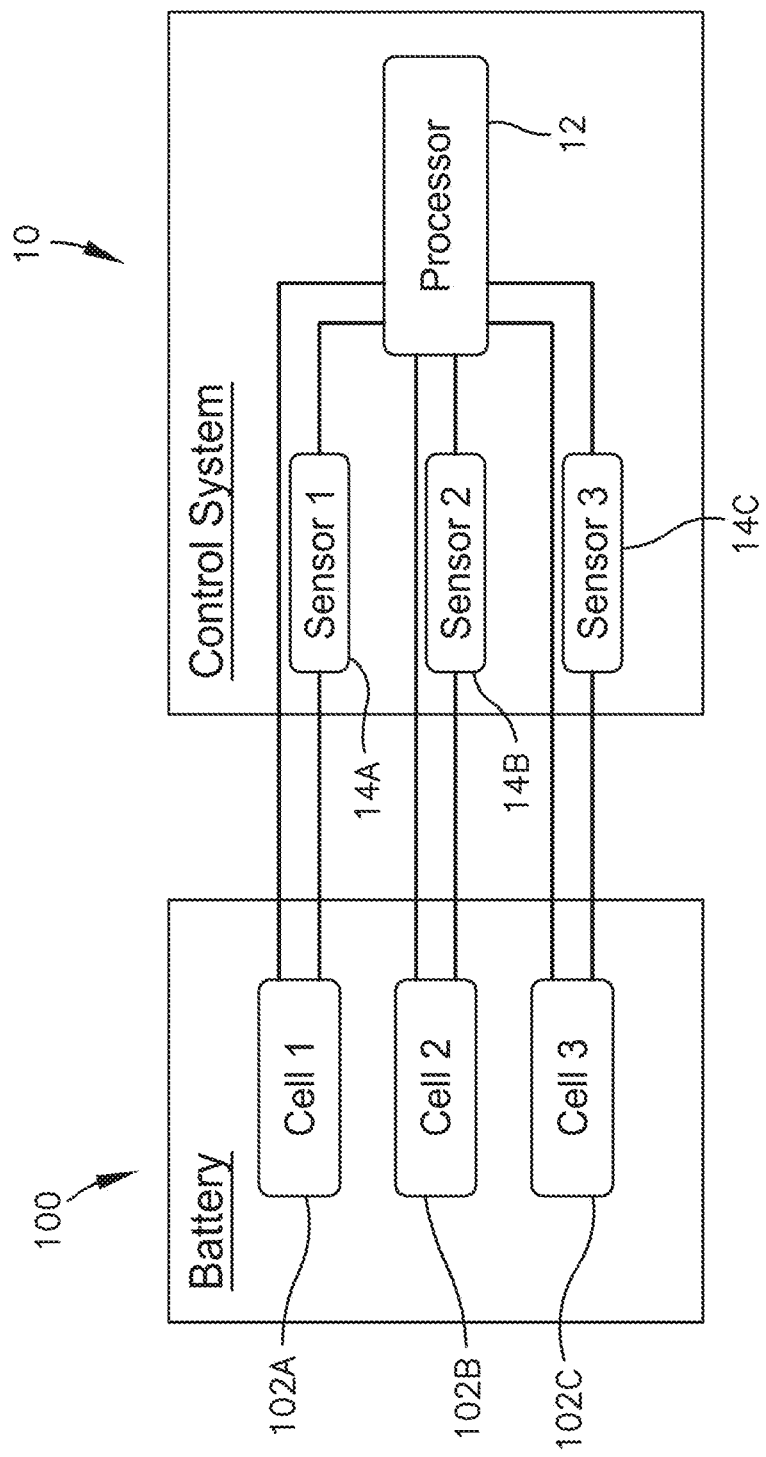
FIG. 1 is a schematic diagram of a battery management system constructed in accordance with an embodiment of the invention and shown connected to a multi-cell battery.

Turning to the drawing figures, and particularly FIG. 1, embodiments of the present invention may be used to balance battery cells of a multi-cell battery 100. The multi-cell battery 100 may be a lithium or lithium-ion battery or any other suitable battery. Although only three battery cells 102A-C are shown, it will be understood that multi-cell batteries having any number of battery cells may be used.

A multi-cell battery management system 10 constructed in accordance with an embodiment of the present invention will now be described in detail. The multi-cell battery management system 10 broadly comprises a processor 12 and a plurality of sensors 14.

The processor 12 selects battery cells of a multi-cell battery 100 for adjusting charges of the selected battery cells via probability, as described in more detail below. The processor 12 may include a circuit board, memory, and other electronic components such as a display and inputs for receiving external commands and a transmitter for transmitting data and electronic instructions.

The processor 12 may implement aspects of the present invention with one or more computer programs stored in or on computer-readable medium residing on or accessible by the processor. Each computer program preferably comprises an ordered listing of executable instructions for implementing logical functions and generating and manipulating data such as probabilistic outcomes, data representative of battery cell charge, and battery cell charging, discharging, and balancing instructions. Each computer program can be embodied in any non-transitory computer-readable medium, such as a memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The sensors 14A-C return voltages, voltage divergences, currents, battery cell impedances, and/or any other battery cell state. Each sensor 14A-C may be responsible for one battery cell 102A-C or a single sensor may be used for more than one battery cell. Thus, although three sensors 14A-C are described and shown, it will be understood that any number of sensors may be used.

Figure 2:
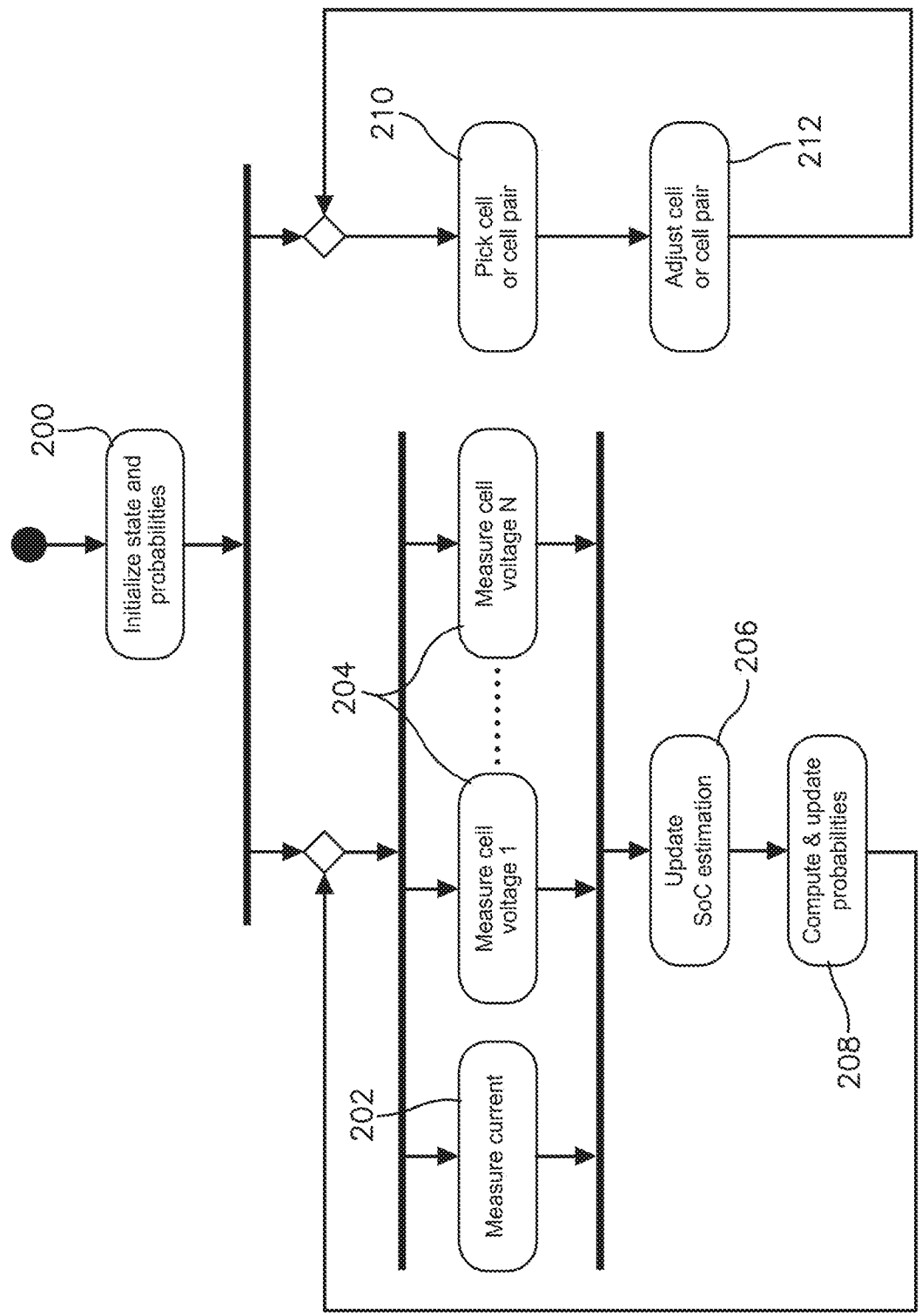
FIG. 2 is a flow diagram of a method of managing a multi-cell battery in accordance with an embodiment of the invention.

With reference to FIG. 2, real time active multi-cell balancing via the multi-cell battery management system 10 will now be described in detail. First, the multi-cell battery management system 10 is initialized according to the type, model, battery cell number, and/or layout of the multi-cell battery 100, and initial battery cell states and initial battery cell selection probabilities may be assigned for each battery cell 102A-C in a probability table, as shown in block 200. For example, the initial battery cell selection probabilities may be equal for all of the battery cells 102A-C or may take into account different initial battery cell states. In one embodiment, the probability table may be a normalized cumulative probability table.

Currents and voltages are then measured across the battery cells 102A-C via the sensors 14A-C, as shown in blocks 202 and 204. The measured current and voltage values may be stored in the probability table.

Figure 3:
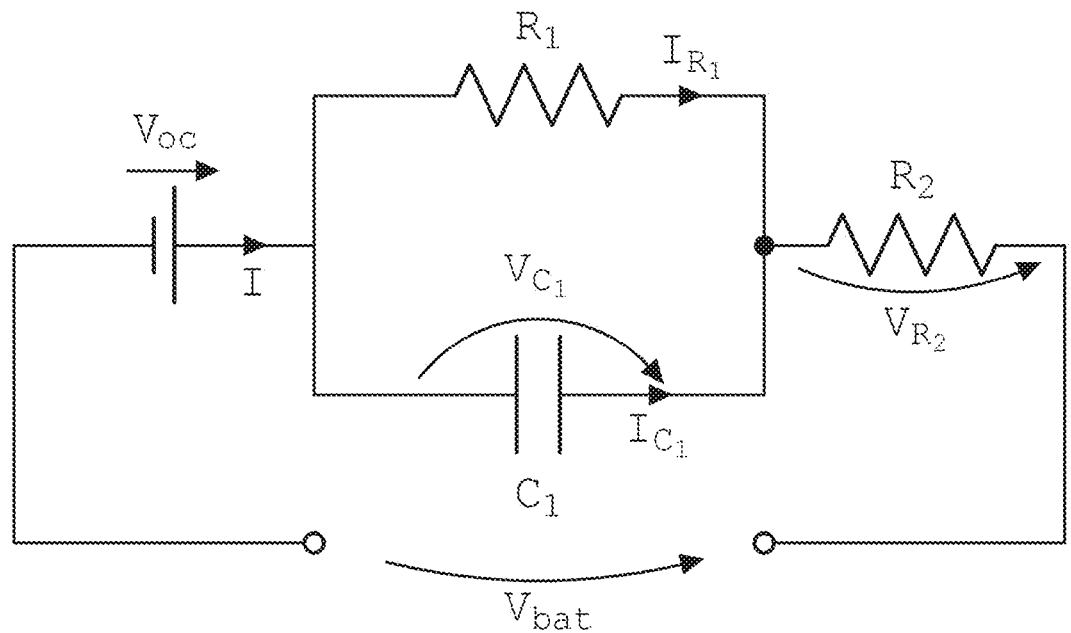
FIG. 3 is an electrical schematic diagram of a Thevenin battery model as is known in the prior art.
Figure 4:
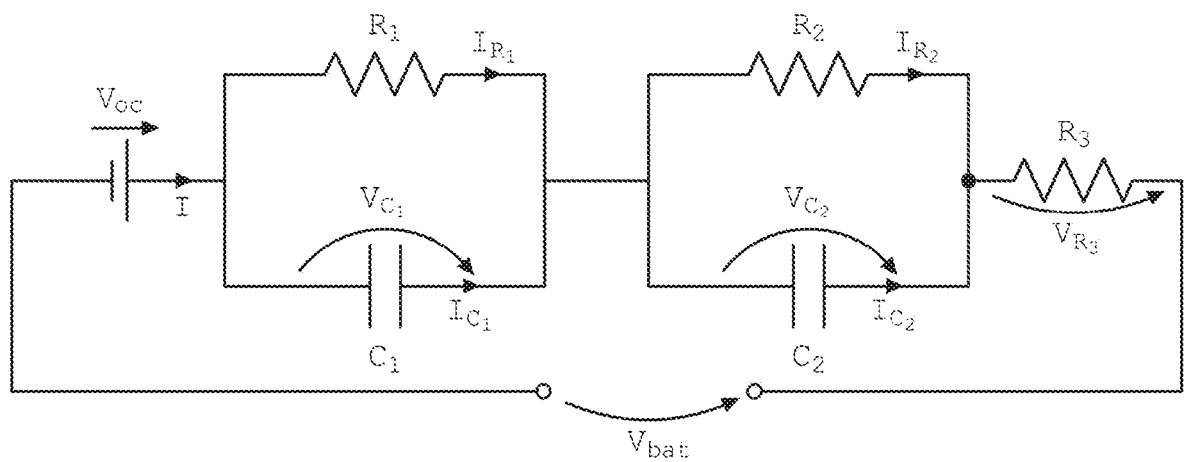
FIG. 4 is an electrical schematic diagram of a dual polarization battery model as is known in the prior art.

The measured current and voltage values are then used to estimate states of charge of the battery cells 102A-C, as shown in block 206. This may be performed via a Thevenin model (FIG. 3), a dual polarization model (FIG. 4), or any other suitable state of charge estimation technique. The Thevenin model includes internal resistances from the physical electrodes and models the electrolyte as a resistor-capacitor pair. The dual polarization model includes internal resistances from the physical electrodes and models the electrolyte as resistor-capacitor pairs in series. This model separates surface and diffusion effects in the electrolyte. Block 206 may be performed over a relatively slow timescale such as approximately one percent of a battery discharge time.

The states of charge are then used to compute cell selection probabilities for adjusting charges of each battery cell 102A-C, as shown in block 208. The probabilities are updated in the probability table, which may be fit to a probability function. For example, the probability table may be a normalized cumulative probability function such that the probability of one of the battery cells 102A-C being selected is a function of the battery cell's deviation from the mean state of charge of all of the battery cells 102A-C, with the sum of all of the probabilities being equal to 1. The above steps 202-208 are repeated as needed.

A battery cell 102A-C or battery cell pair may be selected according to the probabilities in the probability table, as shown in block 210. Battery cells that have a state of charge that has a high deviation from the mean state of charge are more likely to be selected, whereas battery cells that have a state of charge that is close to the mean state of charge are less likely to be selected. The processor 12 then adjusts the charge of the selected battery cell or battery cell pair, as shown in block 212. For example, if the multi-cell battery 100 is being charged, the selected battery cell may receive an incremental charge. If the multi-cell battery 100 is being discharged, an incremental charge may be drawn from the selected battery cell. If the multi-cell battery 100 is only being balanced, a charge may be moved between a pair of selected battery cells. Steps 210-212 may be performed several times per second, such as at a rate of every 10 milliseconds. In this way, the battery cells 102A-C are balanced in real time. The probability table may be updated at a one-to-one rate as the battery cell or battery cell pair adjustments are made or at any other suitable rate. Steps 210-212 may be performed simultaneously with steps 202-208.

In one embodiment, data representative of a dummy battery cell may be added to the probability table. The dummy battery cell has a state of charge with a fixed deviation from the mean state of charge. When the battery cells 102A-C are unbalanced, the probability of the dummy battery cell being selected is low and thus the dummy battery cell is selected relatively infrequently. When the battery cells 102A-C are well-balanced, the dummy battery cell is selected relatively frequently. This prevents the multi-cell battery management system 10 from unnecessarily trying to balance very small deviations.

The above-described multi-cell battery management system 10 provides several advantages over conventional battery management systems. For example, the multi-cell battery management system 10 chooses battery cells for receiving a charge or for having a charge withdrawn therefrom according to probabilistic selection, which results in more balanced charging and discharging across all of the battery cells. The probabilistic selection prevents battery cells from being overcharged or over-depleted and does not focus on the weakest battery cell or the strongest battery cell, which increases battery life. The probabilistic selection also prevents some battery cells from being under-utilized, which maximizes battery discharge depth and battery strength. Battery balancing according to probabilistic selection can also be performed at rest by adjusting charge between selected pairs of battery cells.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented system for balancing battery cells of a multi-cell battery having a plurality of battery cells, the computer-implemented system comprising:
a processor configured to:
determine a state of charge for each battery cell;
generate a probability table for the plurality of battery cells, the probability table having probabilities based on a deviation from a mean state of charge for each battery cell;
select one of the battery cells via probabilistic selection according to the probabilities;
generate an instruction for adjusting a charge of the selected battery cell; and
transmit the instruction such that the charge of the selected battery cell is adjusted.

2. The computer-implemented system of claim 1, wherein the probability table is a normalized cumulative probability table.

3. The computer-implemented system of claim 1, wherein determining a state of charge for each battery cell is performed over approximately one percent of a total battery discharge time.

4. The computer-implemented system of claim 1, wherein the probability table includes a selectable dummy battery cell having a fixed deviation from the mean state of charge such that a probability of selecting the dummy battery cell is higher if the battery cells are more balanced than if the battery cells are less balanced, the processor being configured to not generate a battery cell adjustment instruction if the dummy battery cell is selected so as to prevent unnecessary small deviation balancing.

5. The computer-implemented system of claim 1, wherein the processor is configured to simultaneously a) select the battery cell and generate the battery cell adjustment instruction and b) determine the state of charge for each battery cell and generate the probability table for all of the battery cells.

6. The computer-implemented system of claim 5, wherein the processor is configured to update probabilities in the probability table and select battery cells at a one-to-one rate.

7. The computer-implemented system of claim 1, wherein adjusting the charge of the selected battery cell includes moving charge from another battery cell to the selected battery cell.

8. The computer-implemented system of claim 1, wherein the processor is configured to select the battery cell and generate the battery cell adjustment instruction in approximately 10 microseconds.

9. A method of balancing battery cells of a multi-cell battery, the method comprising the steps of:
determining a state of charge for each battery cell;
generating a probability table for the battery cells, the probability table having probabilities based on a deviation from a mean state of charge for each battery cell;
selecting one of the battery cells via probabilistic selection according to the probabilities;

generating an instruction for adjusting a charge of the selected battery cell; and transmitting the instruction such that the charge of the selected battery cell is adjusted.

10. The computer-implemented method of claim 9, wherein the probability table is a normalized cumulative probability table.

11. The computer-implemented method of claim 9, wherein the step of determining a state of charge for each battery cell is performed over approximately one percent of a total battery discharge time.

12. The computer-implemented method of claim 9, wherein the probability table includes data representative of a selectable dummy battery cell having a fixed deviation from the mean state of charge such that a probability of selecting the dummy battery cell increases as the battery cells become more balanced so as to prevent unnecessary small deviation balancing, the charge adjusting instruction not being generated if the dummy battery cell is selected.

13. The computer-implemented method of claim 9, wherein the processor is configured to simultaneously a) select the battery cell and generate the battery cell adjustment instruction and b) determine the state of charge for each battery cell and generate the probability table for all of the battery cells.

14. The computer-implemented method of claim 13, wherein the processor is configured to update probabilities in the probability table and select battery cells at a one-to-one rate.

15. The computer-implemented method of claim 9, wherein adjusting the charge of the selected battery cell includes moving charge from another battery cell to the selected battery cell.

16. A method of balancing battery cells of a lithium or lithium-ion multi-cell battery during charging or discharging of the multi-cell battery, the method comprising the steps of:

determining a state of charge for each battery cell;

generating a normalized cumulative probability table for all of the battery cells plus a selectable dummy battery cell having a fixed deviation from a mean state of charge, the steps of determining the states of charge and generating the normalized cumulative probability table being performed over approximately one percent of a total battery charge or discharge time;

selecting one of the battery cells or the dummy battery cell via probabilistic selection according to the probability table, the probability of selecting the dummy battery cell being higher if the battery cells are more balanced than if the battery cells are less balanced so as to prevent unnecessary small deviation balancing;

generating an instruction for adjusting a charge of the selected battery cell if the dummy battery cell is not selected, the steps of selecting the battery cell and generating the charge adjustment instruction being performed over approximately 10 milliseconds; and transmitting the instruction such that the charge of the selected battery cell is adjusted if the dummy battery cell is not selected.

* * * * *